Sept. 10, 1929.  A. I. DONNELLON  1,728,153
DISHWASHER
Filed June 2, 1928  3 Sheets-Sheet 1

Alice I. Donnellon
INVENTOR

BY Victor J. Evans
ATTORNEY

WITNESS: John Donovan

Sept. 10, 1929.  A. I. DONNELLON  1,728,153
DISHWASHER
Filed June 2, 1928  3 Sheets-Sheet 2

Alice I. Donnellon
INVENTOR

BY Victor J. Evans
ATTORNEY

WITNESS: John Donovan

Sept. 10, 1929.  A. I. DONNELLON  1,728,153
DISHWASHER
Filed June 2, 1928  3 Sheets-Sheet 3

Alice I. Donnellon
INVENTOR
BY Victor J. Evans
ATTORNEY

WITNESS:

Patented Sept. 10, 1929.

1,728,153

UNITED STATES PATENT OFFICE.

ALICE I. DONNELLON, OF BROOKLYN, NEW YORK.

DISHWASHER.

Application filed June 2, 1928. Serial No. 282,348.

My present invention has reference to machines for washing dishes and more particularly to machines of this class which are adapted to be used in an ordinary kitchen.

The primary object of the invention is the provision of a dish washing maching designed to rest on a drain board of a sink and to have a removable hose connection with the hot water faucet for the sink, whereby such water will be delivered into the device and sprayed in a novel manner over all of the dishes and other utensils arranged upright in the device, whereby the foreign substances will be removed from such dishes and utensils and further wherein a rotary dasher is provided for agitating and splashing the water in the device against the dishes to more effectively rinse and clean the same, the device being provided with an outlet which delivers into the sink as well as overflows for the water which likewise deliver into the sink, and further wherein the cover of the device when removed after the dish washing operation will permit of the dishes in the device being aired and dried and thereafter removed from the casing of the device in a thoroughly cleaned and dried condition by the lifting from the casing of a basket which holds the said dishes and receptacles upright.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 6 is a similar view of the rack or holder for cups or the like.

Figure 8 is a detail view to illustrate the clamp on the hose to engage with the faucet.

Figure 1:
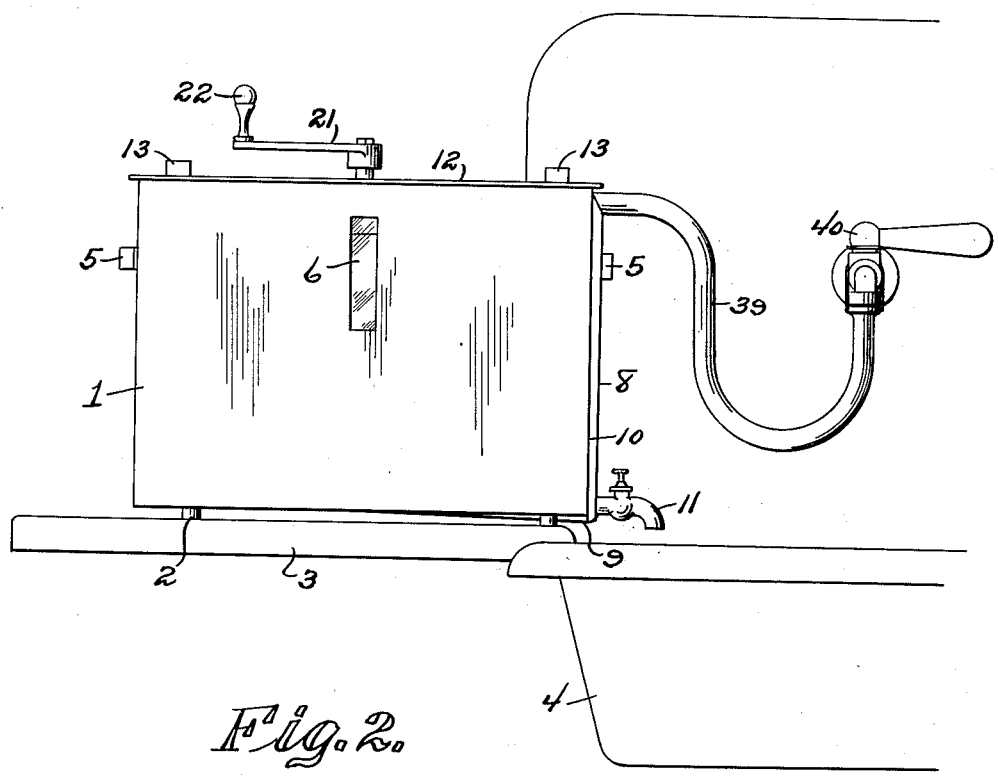
Figure 1 is a side elevation of my improvement.
Figure 2:
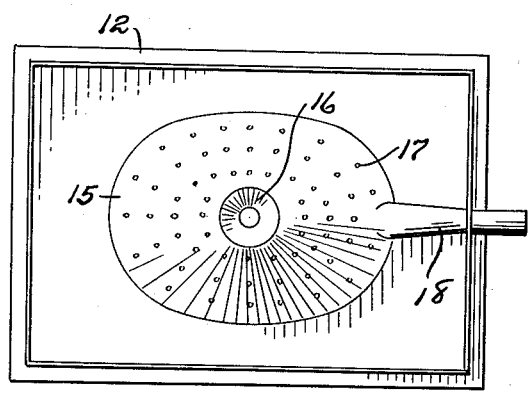
Figure 2 is an under face view of the cover for the casing thereof.
Figure 3:
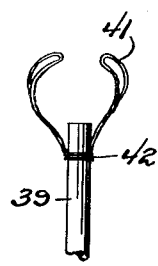
Figure 3 is an appromixately central longitudinal sectional view through the improvement.
Figure 3:
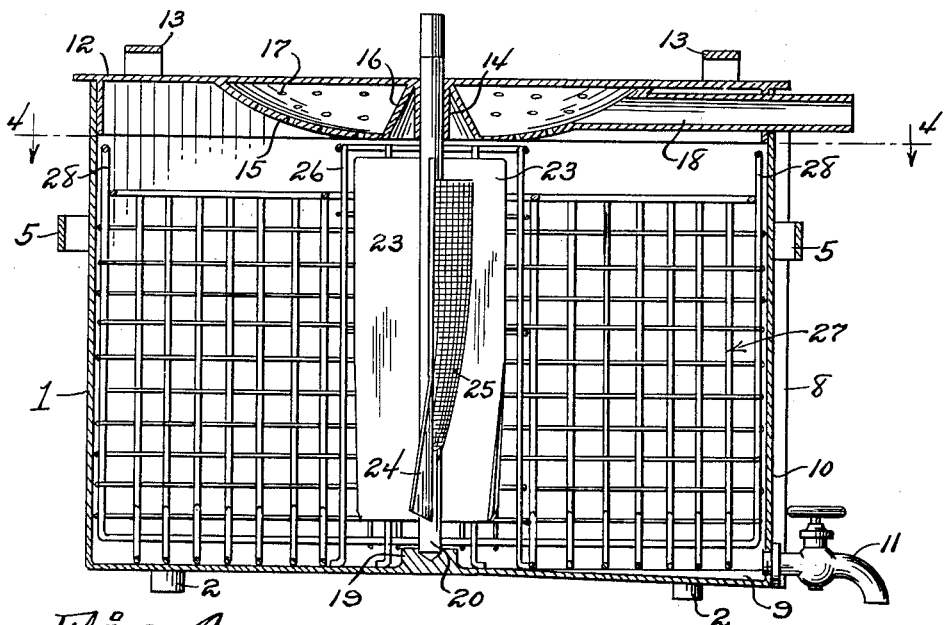
Figure 4:
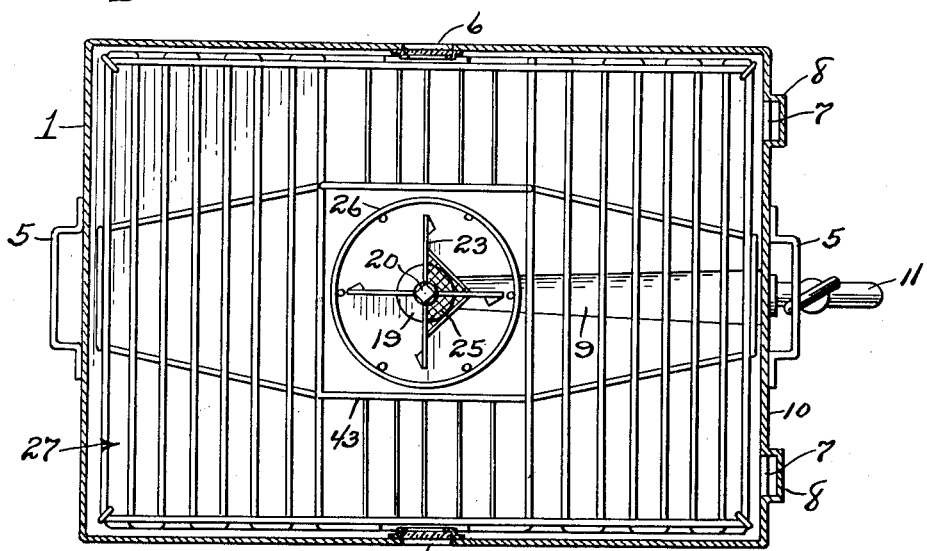
Figure 4 is a sectional view approximately on the line 4—4 of Figure 3.
Figure 5:
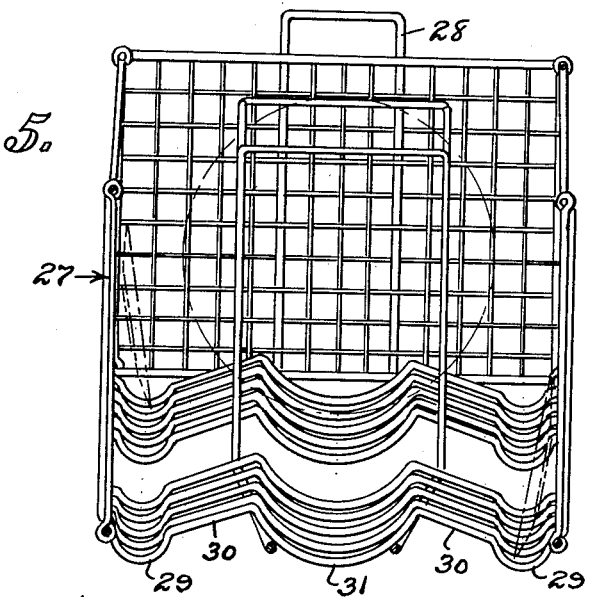
Figure 5 is a transverse sectional perspective view of the basket.

In carrying out my invention I employ a substantially rectangular metal casing 1. This casing is provided on its under face with legs 2. These legs are preferably of glass or other non-corrosive and non-scratchable material. As disclosed by Figure 1 of the drawings, the legs rest directly upon a drain board 3 for a kitchen sink 4 and also as disclosed by Figure 1 it will be noted that one end of the casing projects slightly over the sink.

The casing has its opposite ends provided with handles 5 and has its sides provided with openings that are sealed by transparent plates 6. These plates are arranged adjacent to the top of the casing and provide means whereby the operator can observe the height of water in the casing. The casing has its end which extends over the sink formed, adjacent its top and also adjacent its corners, with openings 7 that provide outlets for the overflow of water in the casing. The casing on its outer face has formed therewith or secured thereto the edges of substantially U-shaped spouts 8, the tops of the spouts being fixed to the casing, and the bottoms thereof being open and being arranged in a line with the bottom of the casing. The bottom of the casing, at the center thereof, and from the end provided with the overflow openings and spouts is formed with a longitudinally extending depression 9 that is gradually widened and deepened from the center of the said receptacle, to the end thereof. This depression affords the bottom of the casing with a gutter, and fixedly secured on the end of the casing, which for distinction is indicated by the numeral 10, there is a faucet 11 whose mouth or outlet end is downwardly directed.

The open top of the casing is designed to be closed by a flanged cover 12. The flange of the cover frictionally engages with the casing so as to afford a water-tight joint therebetween. The cover is provided, adjacent its ends, with handles 13 and is centrally formed with a round opening that is surrounded by a depending sleeve 14. The top of the casing, on the under face thereof has formed therewith a spray head of a novel construction, the same comprising a concaved disc 15 whose edges are formed with or secured to the casing. The disc has an inwardly flared portion 16 through which the sleeve 14 is received and the edge of this portion 16, is, of course, fixed to the under face of the casing. The spray head is provided with annular series of apertures 17. The walls provided by these apertures are arranged at outward angles with respect to the axial center of the cover so that water delivered into the spray head will be ejected through the apertures thereof over the entire inner surface of the casing 1. A pipe member 18 provides a water inlet for the spray head, and this pipe member extends through one of the flanges of the cover and likewise through a depression provided therefor in the end 10 of the casing.

Preferably integrally formed on the inner face of the bottom of the casing, at the center thereof there is an upstanding lug or boss 19 provided with an opening whose bottom wall is inwardly flared, the said opening affording a bearing for the pointed end of a shaft 20. This shaft extends vertically through the casing and is received through the sleeve 14, the said sleeve, of course, affording a bearing for the shaft. The outer end of the shaft is square in cross section and is designed for engagement with the socket end of an angle operating member 21. The upstanding handle 22 of the member 21 is preferably ornamented and the crank handle is comparatively small. Fixed on the shaft 20 there are right angularly disposed dasher blades 23. Each of the blades has its lower end curved inwardly, as at 24, and fixed on the shaft between two of the blades 23 there is the reticulated pocket 25 that affords a soap holder. The dasher blades are surrounded by a cylindrical frame 26 whose lower end is fixed to the bottom of the casing 1 and whose upper end terminates slightly below the bellied spray head 15. The frame 26 is formed of vertically extending spaced wire members which are surrounded by spaced wire rings, the said rings being soldered or otherwise secured to the vertically disposed members of the frame.

Designed to be snugly received in the casing 1, after the closure 12 has been removed therefrom there is a substantially rectangular basket which is broadly indicated by the numeral 27. The basket is wholly formed of wires, the frame and the body portion of the basket being in the nature of a mesh, that is, the same comprises spaced vertical and spaced longitudinal wires which, of course, are suitably connected, and the corner as well as the edge members of the frame are preferably of wires of thicker gauge than the intermediate wires. The basket 27 has certain of the thicker wires, at the ends thereof, extended to provide substantially U-shaped handles 28. The bottom wires are also thicker than the inner wires of the body of the frame. The bottom of the open or wire frame is particularly and peculiarly constructed. All of the bottom wires are suitably spaced, each having their ends connected to the lower longitudinal wires of the frame portion and from thence the bottom wires are rounded downwardly, as at 29, extended from the rounded portions at upward and inward angles, as at 30, and the straight but inclined portions 30 are centrally rounded downwardly, as at 31. The rounded portions 31 are of a materially greater width than the portions 29, the portions 29, as a matter of fact, affording feet for the basket and which feet rest on the bottom of the casing 1. The angle portions 30 afford therebetween gripping elements for saucers or small dishes, while the downwardly rounded central portions 31 of the spaced bottom wires afford therebetween gripping elements for plates or like dishes supporting them upright.

Figure 6:
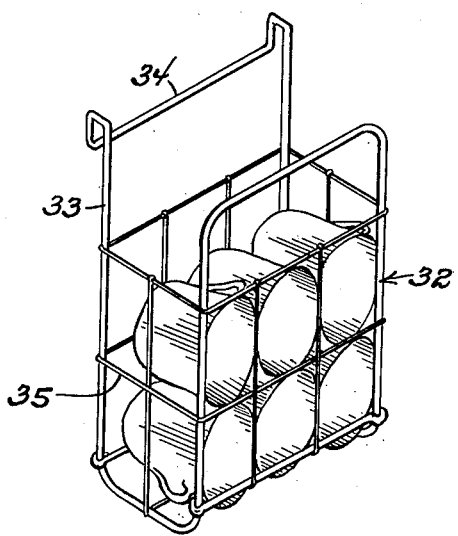
Figure 7:
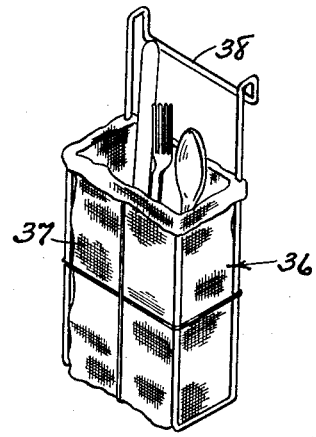
Figure 7 is a similar view of the rack or holder for utensils such as knives, forks, spoons and other silverware.

By this arrangement it will be noted that a comparatively large number of plates and saucers may be arranged and firmly sustained in the bottom of the basket. To support cups or other utensils I provide a substantially rectangular rack 32, illustrated by Figure 6 of the drawings. By reference to this figure it will be seen that a single wire is employed for providing the corners, the lower elements of the side, the top of the front and the top of the back of the rack. This wire body member is for distinction indicated by the numeral 33 and the same at the back thereof is bent outwardly and downwardly to provide a lip 34 which is designed to be arranged over and supported by the upper longitudinal wires of the frame 27. The parts of the body wire 33 are connected by smaller spaced vertical and transversely connected wires 35. The front of the rack 32 has its top disposed a suitable distance below its lipped back.

The holder for knives, spoons, forks or other silverware, is in the nature of a rack which is similarly constructed to the rack 32. The body of this rack is indicated by the numeral 36, and has, however, secured therearound a soft but loosely woven fabric body 37. The body is in the nature of a sack-like member and protects the silverware deposited therein from injury. The lipped portion 38 of the rack 36 is supported from the top longitudinal members 27.

When the rack is arranged in the casing and the cover position thereon I attach to the outer end of the pipe 18 one end of a comparatively small rubber or like flexible tube 39. The second end of this hose is forced over the outlet end or mouth of the hot water spigot 40 for the sink. There is fixed on the end of the tube that engages with the faucet 40 a spring wire clamp. This clamp is constructed from a single strand of wire rounded upon itself to provide inwardly directed spring jaws 41 disposed opposite each other and the inner ends of the wires providing the jaws are rounded upon themselves, as at 42, to receive therethrough and to clamp thereon the said outer end of the tube 39.

A quantity of sliced soap is arranged in the soap holder. If desired any grease solvent is arranged in the soap holder. The dirty dishes and utensils are arranged in the basket and in the racks. The hot water faucet is turned on so that the same is directed into the spray head and forcibly sprayed from the said head onto all of the dishes and utensils in the casing 1. When the water reaches a predetermined level, observable through the sight openings 6, the faucet is turned off. Any cold water will pass through the overflow openings 7 and through the spouts 8 and will be directed into the sink. When the water to the desired level is received in the casing the operating handle is turned to rotate the dasher. The dasher is swiftly rotated for a comparatively small period of time, say not one minute. The rounded lower ends of the dasher blades will not only agitate the water in the casing against the dishes but the inwardly curved lower portions of the blades thereof will forcibly direct such water upwardly against the dishes so that all grease and dirt will be removed therefrom. After the washing and cleaning operation the faucet 11 is opened to drain the water from the device into the sink. While this faucet is still open the supply faucet 40 is again opened to direct water through the spray head onto the dishes and utensils for sterilizing the same. The faucet 40 is now turned off and the cover is removed for a few minutes in order to permit air entering the casing and drying the dishes. Only a few minutes is required in the drying process. The washing, cleaning, sterilizing and drying operations are performed without the employment of dish cloths or towels and without necessitating the operator wetting her fingers. After the dishes are thoroughly dried the handles are grasped and the basket with the dishes and utensils therein is removed from the casing. The dishes are withdrawn from their holders and racks and are arranged in their proper places. The clamping jaws 41 are removed from the faucet 40. In this connection it should be stated that the clamping jaws engage with the rear portion of the faucet 40. The tube may be detached from the pipe member 18, after the emptied basket and rack are again positioned in the casing, being itself positioned in the casing. In a like manner the handle may be removed from the shaft and positioned in the basket.

The basket, at the center thereof, is formed with an upstanding substantially rectangular guard 43 which receives the cylindrical guard for the dasher when the basket is arranged in the casing. The guard 43 is, of course, constructed of spaced wires similar to the body of the basket.

My improvement is of a simple nature, may be constructed in various sizes to accommodate any desired number of dishes and utensils, is, except for the manual turning of the dasher shaft, automatic in operation, neat in appearance and will perform its functions with ease and accuracy and with only the smallest amount of physical exertion, it being understood that the dasher is only turned for approximately one minute.

Having described the invention, I claim:

In a dish washer, a casing, a shaft having its lower portion journaled in the bottom of the casing, dasher blades extending angularly from the shaft, a reticulated soap holder on the shaft between two of the dasher blades, said blades having their lower edges curved, a reticulated dish holding frame in the casing, a cover for the open top of the casing and through which the shaft of the dasher passes, a spray head on the inner face of the cover, and means for directing water under pressure through the spray head onto the frame, water overflows leading from adjacent the top of the casing, and an outlet faucet for the casing.

In testimony whereof I affix my signature.

MRS. ALICE I. DONNELLON.